J. C. DOUST.
CLOTHES LINE REEL.
APPLICATION FILED AUG. 29, 1910.
1,004,753.
Patented Oct. 3, 1911.
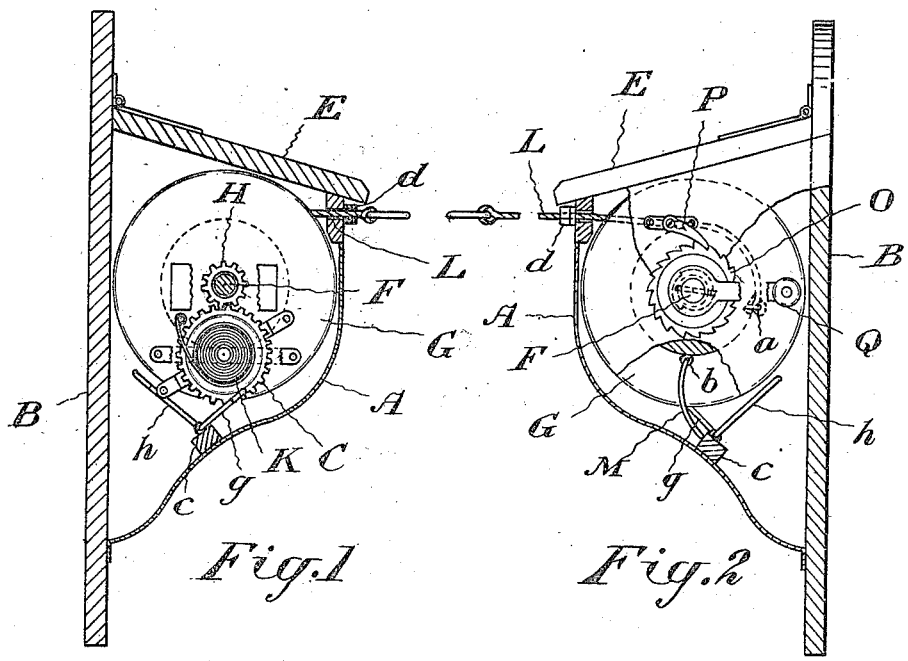
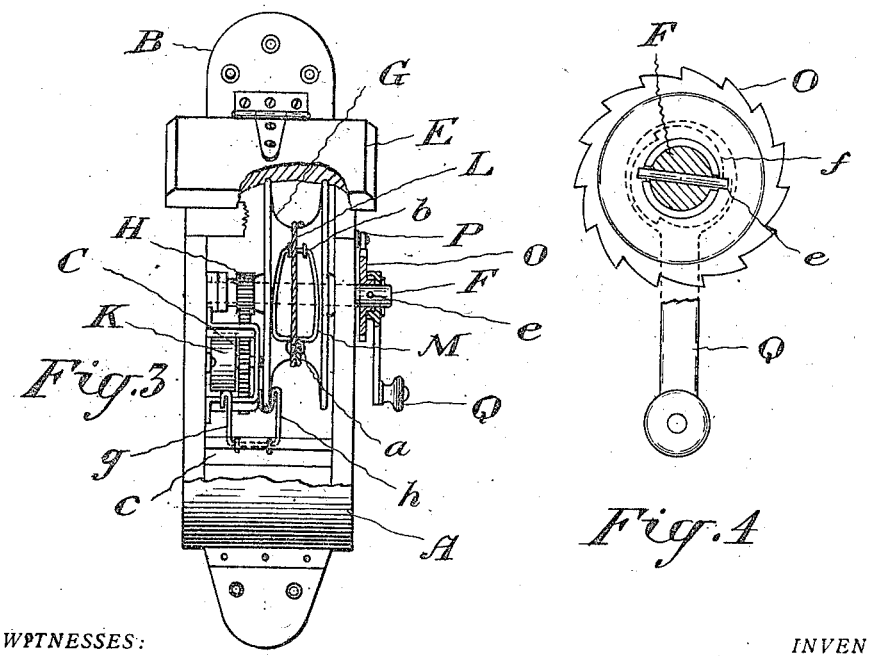
WITNESSES:
W. J. McMillan
E. P. Hall
INVENTOR.
J. C. Doust
BY Ridout & Maybee
ATTORNEY.

UNITED STATES PATENT OFFICE.

JAMES C. DOUST, OF TORONTO, ONTARIO, CANADA.

CLOTHES-LINE REEL.

1,004,753.  Specification of Letters Patent.  Patented Oct. 3, 1911.

Application filed August 29, 1910. Serial No. 579,368.

*To all whom it may concern:*

Be it known that I, JAMES C. DOUST, of the city of Toronto, in the Province of Ontario, Canada, have invented certain new and useful Improvements in Clothes-Line Reels, of which the following is a specification.

My object is to devise means for holding a clothes line so that it is sheltered from the weather when not in use and yet may be instantly drawn out to any desired length and automatically re-wound when no longer required.

My device comprises a casing containing a suitably journaled reel for the clothes line and spring actuated means for rotating the drum to wind up the line.

Special features of the construction are the arrangement by which the complete unwinding of the rope is prevented, the means for preventing injury to the spring if the line breaks, and the means for preventing the backward rotation of the drum otherwise than by the spring.

Figure 1 is a side elevation, partly in section, of a clothes line reel constructed in accordance with my invention. Fig. 2 is a similar view taken from the other side. Fig. 3 is a front elevation with the front of the casing removed. Fig. 4 is a detail of the crank arm connections.

In the drawings like letters of reference indicate corresponding parts in the different figures.

A is a casing suitably shaped to support the parts and provided with a back B which may be secured to a wall or fence. The top of the casing is formed by a hinged lid E, through which the interior of the casing may be got at. In the casing is journaled a spindle F, carrying a drum G for the clothes line L. On the spindle is secured a gear pinion H meshing with a gear wheel C actuated by the clock spring K which thus tends to rotate the drum G to wind up the line.

The clothes line L is secured at $a$ by a suitable staple or nail. If the clothes line should be drawn fully out, the pull on the staple would be directly in line with its length and it would quickly pull out. To overcome this difficulty and to convert the end strain on the staple to a side strain I pivot on the drum a dog M. This is bail-shaped as shown and its ends $b$ are pivoted on the drum as shown in Figs. 1 and 3. The clothes line when wound upon the drum holds this dog down close to the drum. When the line is drawn out and its last coil unwrapped, the dog under the influence of gravity and centrifugal force will fly out in position to engage the stop $c$ secured to the casing and the unwinding of the clothes line promptly ceases, leaving part of the end of the line wrapped around the drum so that the pull on the staple is directed sidewise. The line leads from the drum through a fair lead $d$ in the front of the casing.

In order that the clothes line may be held with any desired length unwound, I provide the spindle F outside the casing with a ratchet wheel O which is engaged by the pivoted dog P. When the clothes line is to be drawn out, the dog will be thrown back clear and the ratchet wheel and the drum are then freely rotatable. When the line is to be used it is drawn out and its end connected with a suitable stationary part. The drum may then be rotated by means of the crank arm connected to the ratchet wheel to tighten up the line as may be necessary, the drum being held as rotated by the dog P engaging the ratchet wheel O. The connection between the ratchet wheel and the crank is preferably by means of a sliding pawl and a ratchet. The pawl $e$ slides in the hub of the ratchet wheel O and is adapted to engage the ratchet $f$ formed in the hub of the crank handle Q. The pawl $e$ will of course duly drive the ratchet wheel O in one direction and all trouble due to careless or mischievous persons rotating the drum G in the wrong direction is avoided.

In the event of the line breaking, the spring will of course begin to rotate the drum and the latter will often acquire such momentum that the spring will be turned inside out. I guard against this possibility by pivoting a brake on the casing, one arm $g$ of which is bent to lie in the path of the expanding spring while the other $h$ is bent to engage the rim of the drum G, thus any abnormal expansion of the spring puts a brake on the drum and stops it before any injury is done to the spring.

The advantages of the device are obvious. A line when not in use is held completely protected from the weather and as it is so easily drawn out for use and re-wound, any inducement to leave a clothes line out in the weather, is removed. The device can be made cheaply enough to bring it within the reach of all.

It will be noted that the drum fits so closely to the top, front and back of the casing that it is impossible for the line to come off the drum.

What I claim as my invention is:—

In a clothes line reel the combination of a casing a drum for the clothes line journaled therein; a gear pinion connected with the drum; a gear wheel meshing with said pinion; a clock spring adapted to rotate the gear wheel; a pivoted brake shaped to engage the drum; and an arm on the brake adapted to be engaged by the expanding spring when the latter exceeds its normal expansion.

Toronto this 24th day of August, 1910.

JAMES C. DOUST.

Signed in the presence of—
J. EDW. MAYBEE,
E. P. HALL.